United States Patent [19]

Priddy, Jr., deceased et al.

[11] 4,133,403
[45] Jan. 9, 1979

[54] MEANS FOR PROPELLING A WHEELED VEHICLE

[76] Inventors: William S. Priddy, Jr., deceased, late of Grenada, Miss., by Betty H. Priddy, administratrix, 116 Rodrick, Grenada, Miss. 38901

[21] Appl. No.: 597,767

[22] Filed: Jul. 21, 1975

[51] Int. Cl.² .............................................. B60K 7/00
[52] U.S. Cl. ................................... 180/65 A; 60/513; 180/44 M; 180/66 F
[58] Field of Search ................. 180/66 F, 66 R, 66 B, 180/66 C, 65 A, 44 M, 44 F, 55; 60/513, 512, 508

[56] References Cited

U.S. PATENT DOCUMENTS

| | | | |
|---|---|---|---|
| 651,158 | 6/1900 | Bergmann | 180/55 X |
| 688,591 | 12/1901 | Cary | 180/55 X |
| 837,722 | 12/1906 | Post | 180/55 |
| 868,441 | 10/1907 | Jenkins | 60/513 |
| 937,859 | 10/1909 | Pieper | 180/44 M |
| 1,317,401 | 9/1919 | Struever | 60/513 |
| 1,688,591 | 10/1928 | Mitton | 180/66 F X |
| 1,744,288 | 1/1930 | Vorel | 60/513 |
| 2,430,528 | 11/1947 | Moon | 180/66 F X |
| 2,918,982 | 12/1959 | Vlachos | 180/66 B X |
| 2,984,067 | 5/1961 | Morris | 60/513 |
| 3,179,016 | 4/1965 | Thornton-Trump | 180/66 F X |
| 3,424,260 | 1/1969 | Stone et al. | 180/66 R |
| 3,581,682 | 6/1971 | Kontranowski | 180/66 F X |
| 3,804,190 | 4/1974 | Shaffer | 180/66 F X |

Primary Examiner—Joseph F. Peters, Jr.
Assistant Examiner—Milton L. Smith
Attorney, Agent, or Firm—John R. Walker, III

[57] ABSTRACT

Electric motors are connected to the front wheels of a vehicle to commence the propulsion of the vehicle. Fluid pressure motors are connected to the rear wheels of the vehicle to propel the vehicle once the electric motors have commenced the propulsion thereof. An electric pump supplies expansible fluid to the fluid pressure motors. Electric heaters expand the fluid in the fluid pressure motors to cause the fluid pressure motors to rotate the rear wheels of the vehicle thereby propelling the vehicle. The electric motors are adapted to act as generators after the fluid pressure motors have commenced the propulsion of the vehicle to recharge a battery that operates the electric motors, the electric pump and the electric heaters.

9 Claims, 5 Drawing Figures

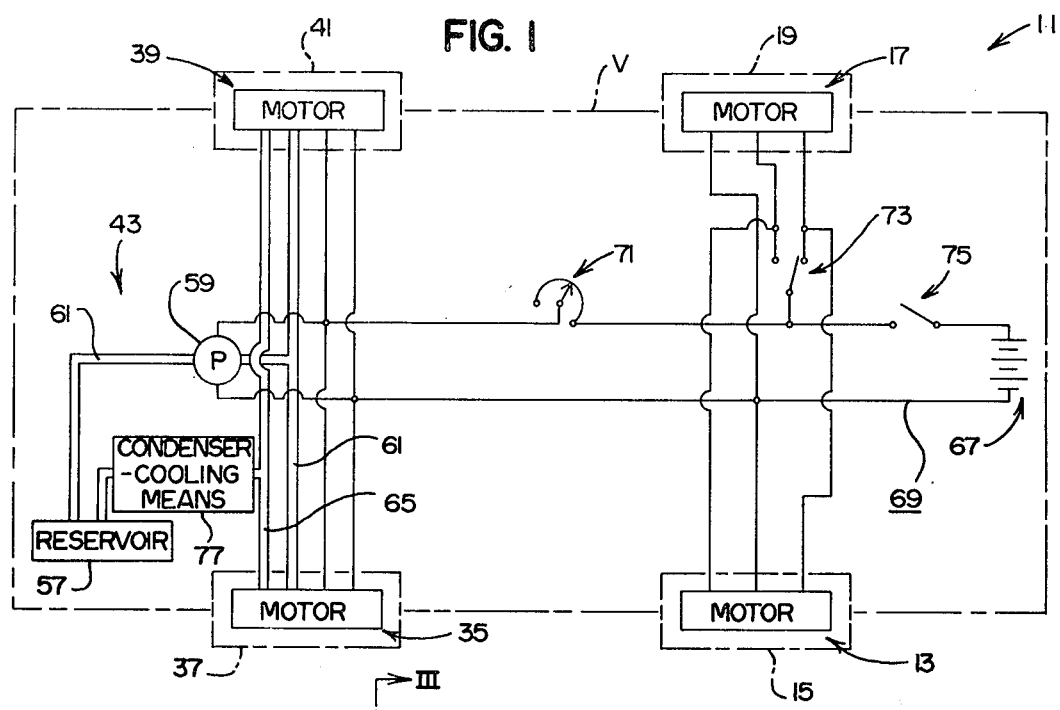
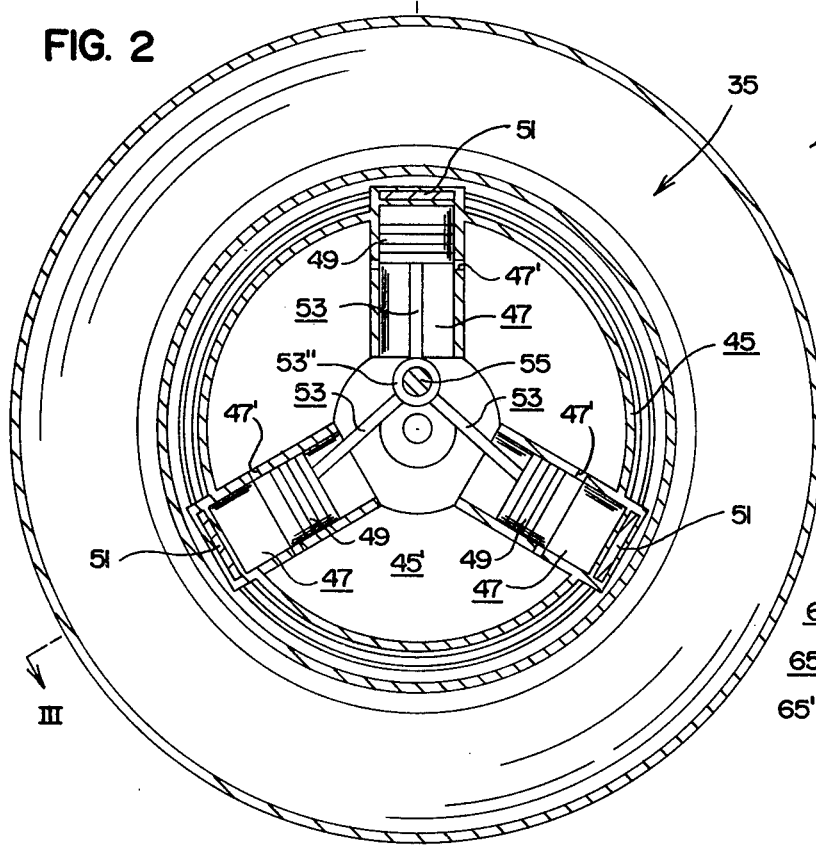
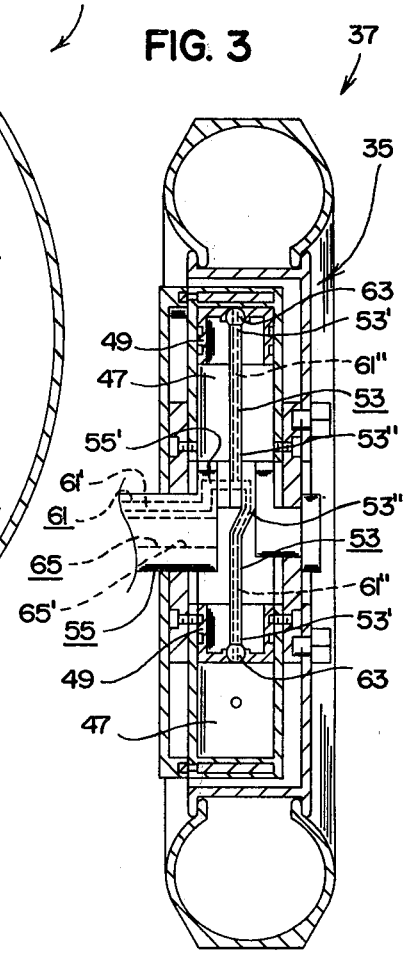

4,133,403

MEANS FOR PROPELLING A WHEELED VEHICLE

BACKGROUND OF THE INVENTION

1. Field of the Invention

This invention relates to means for propelling wheeled vehicles such as automobiles.

2. Description of the Prior Art

Heretofore, various means for propelling wheeled vehicles have been developed. By far the most commons means for propelling wheeled vehicles is the internal combustion gasoline engine. Other means have been utilized. See, for example, Bergmann (U.S. Pat. No. 651,158), Cary (U.S. Pat. No. 688,591), Post (U.S. Pat. No. 837,722), Mitton (U.S. Pat. No. 1,688,591), Moon (U.S. Pat. No. 2,430,528), Thornton-Trump (U.S. Pat. No. 3,179,016), Kontranowski (U.S. Pat. No. 3,581,682), and Shaffer (U.S. Pat. No. 3,804,190). None of the prior means for propelling wheeled vehicles known to applicant disclose or suggest the present invention.

Recent years have seen a growing dissatisfaction with the present means and methods of propelling automobiles and the like. This growing dissatisfaction is due primarily to the inefficient use of energy by these prior means and methods. The use of steam or electrical energy has often been thought as the logical method to efficiently propel automobiles and the like. However, the use of steam or electrical energy to propel vehicles has not been widely accepted due to certain disadvantages therein.

SUMMARY OF THE INVENTION

The present invention is directed towards overcoming the problems and disadvantages of prior means for propelling wheeled vehicles. The concept of the present invention is to provide a wheeled vehicle with preliminary drive means for commencing the propulsion of the vehicle and main drive means for propelling the vehicle once the preliminary drive means has commenced the propulsion of the vehicle. The main drive means includes at least one fluid pressure motor means for driving at least one wheel of the vehicle and includes fluid supply means for supplying fluid to the fluid pressure motor means. The preliminary drive means preferably includes at least one electric motor means for driving at least one wheel of the vehicle to commence the propulsion of the vehicle. The electric motor means is preferably adapted to act as a generator after the main drive means has commenced the propulsion of the vehicle to recharge a battery means which operates the electric motor means and certain components of the main drive means,.

BRIEF DESCRIPTION OF THE DRAWINGS

FIG. 1 is a diagrammatic view of the means for propelling a wheeled vehicle of the present invention showing a wheeled vehicle in phantom lines.

FIG. 2 is a sectional view of one wheel of the vehicle showing portions of the fluid pressure motor means of the main drive means of the present invention.

FIG. 3 is a sectional view as taken on line III—III of FIG. 2.

DESCRIPTION OF THE PREFERRED EMBODIMENT

The means 11 of the present invention is for use in propelling any wheeled vehicle such as an automobile or the like. Preferably, the means 11 is for use with a four-wheeled vehicle V (see FIG. 1). The means 11 includes a preliminary drive means for commencing the propulsion of the vehicle V and a main drive means for propelling the vehicle V after the preliminary drive means has commenced the propulsion thereof.

Figure 4:
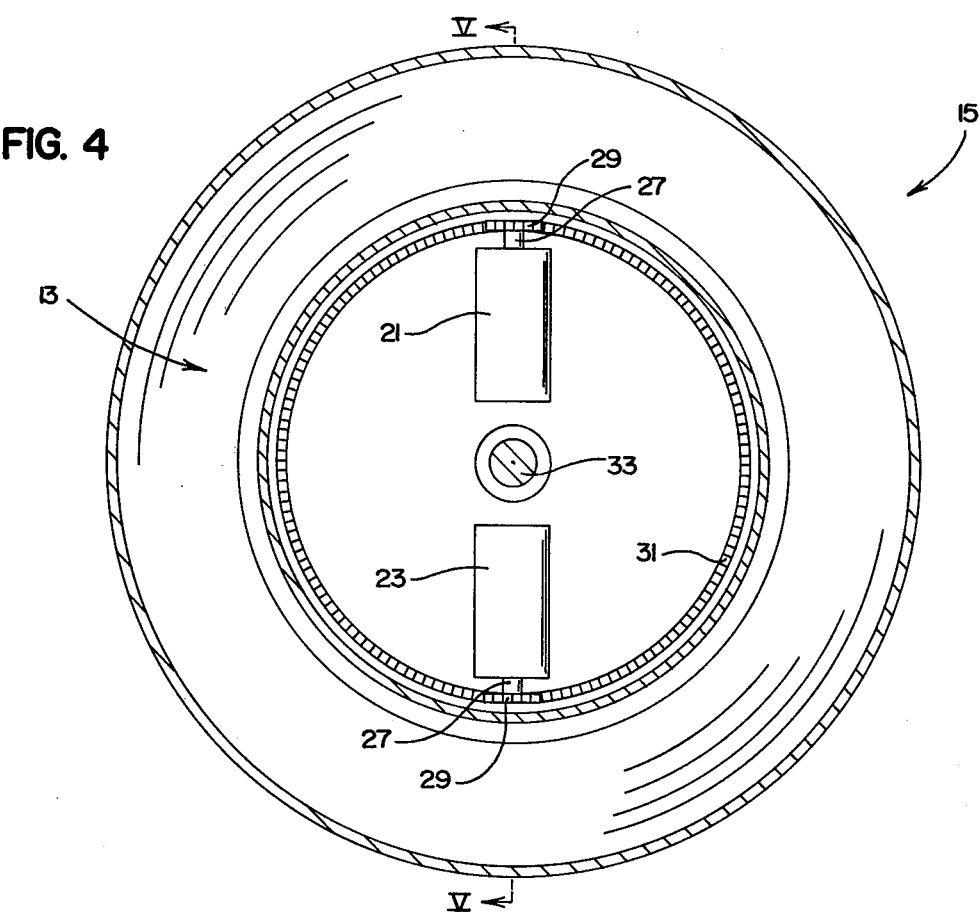
FIG. 4 is a sectional view of one wheel of the vehicle showing portions of the preliminary drive means of the present invention.
Figure 5:
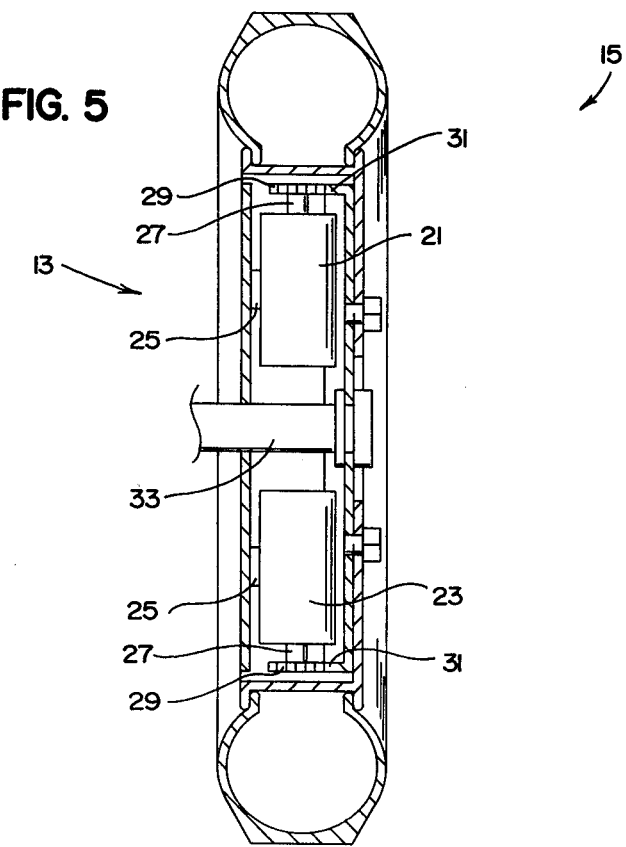
FIG. 5 is a sectional view as taken on line V—V of FIG. 4.

The preliminary drive means includes at least one electric motor means for driving at least one wheel of the vehicle V. Preferably, the preliminary drive means includes a first electric motor means 13 for driving a first wheel 15 of the vehicle V and includes a second electric motor means 17 for driving a second wheel 19 of the vehicle V (see FIG. 1). The first electric motor means 13 preferably includes a first electric motor 21 and a second electric motor 23 (see FIGS. 4 and 5). The first and second electric motors 21, 23 are preferably mounted to the frame of the vehicle V by brackets 25 or the like. Each of the first and second electric motors 21, 23 is provided with the normal rotating shaft 27 onto which is fixed a spur gear 29. The first wheel 15 is provided with an annular rack gear 31 fixedly attached thereto for coacting with the spur gears 29 of the first and second electric motors 21, 23. The first wheel 15 is pivotally mounted to the vehicle V in a manner well known to those skilled in the art (e.g., by the axle 33). It should now be apparent that when the first and second electric motors 21, 23 are activated, the spur gears 29 will cause the annular rack gear 31 to rotate thereby rotating the first wheel 15. The first wheel 15 is preferably provided with typical brake means, tire means and the like in a manner as will be apparent to those skilled in the art. The second electric motor means 17 and the second wheel 19 are constructed in an identical manner to the first electric motor means 13 and the first wheel 15. Thus, the above description of the first electric motor means 13 and first wheel 15 should be sufficient.

The main drive means includes at least one fluid pressure motor means for driving at least one wheel of the vehicle V. Preferably, the main drive means includes a first fluid pressure motor means 35 for driving a third wheel 37 of the vehicle V and includes a second fluid pressure motor means 39 for driving a fourth wheel 41 of the vehicle V (see FIG. 1). In addition, the main drive means includes fluid supply means 43 for supplying fluid to the first and second fluid pressure motor means 35, 39. The first fluid pressure motor means 35 preferably includes a body member 45 fixedly attached to the third wheel 37 of the vehicle V (see FIGS. 2 and 3). The body member 45 includes an interior portion 45' and a plurality of cylinder portions 47. Each of the plurality of cylinder portions 47 is adapted in a manner hereinafter to be explained to receive fluid from the fluid supply means 43. The first fluid pressure motor means 35 also includes a plurality of piston members 49 with one of the plurality of piston members 49 provided in each of the plurality of cylinder portions 47 for back and forth movement therein. Each of the plurality of piston members 49 includes the typical piston rings and the like in a manner as will be apparent to those skilled in the art. The first fluid pressure motor means 35 also includes a plurality of heating members 51 with one of the plurality of heating members 51 being provided adjacent each of the plurality of cylinder portions 47 for causing the fluid in each of the plurality of cylinder portions 47 to expand thereby causing the plurality of piston members 49 to slide back and forth in the plurality of cylinder portions 47. The plurality of cylinder portions 47 are provided with ports 47' to allow the expanded fluid to exit into the interior portion 45' of the body member 45 once the plurality of piston members 49 have been forced to move by the expanding fluid. Each of the plurality of heating elements may be composed of a typical electric heating element or ceramic shielded arc as is well known to those skilled in the art. The first fluid pressure motor means 35 additionally includes a plurality of piston rod members 53. Each of the plurality of piston rod members 53 includes a first end 53' pivotally attached to one of the plurality of piston members 49 and a second end 53" pivotally attached to the frame of the vehicle V at a location eccentric to the axle 55 of the third wheel 37 so that back and forth movement of the plurality of piston members 49 in the plurality of cylinder portions 47 will cause rotation of the third wheel 37 in a manner well known to those skilled in the art thereby propelling the vehicle V. More specifically, the second end 53" of each of the plurality of piston rod members 53 is pivotally attached to an offset portion 55' of the axle 55. The third wheel 37 includes typical brake means and tire means as is well known to those skilled in the art and is pivotally mounted to the fixed axle 55 of the vehicle V. The second fluid pressure motor means 39 and the fourth wheel 41 is constructed in an identical manner to the first fluid pressure motor means 35 and the third wheel 37. Thus, the above description of the first fluid pressure motor means 35 and the third wheel 37 should be sufficient.

The fluid supply means 43 preferably includes a fluid reservoir means 57 for storing fluid and pump means 59 for causing the fluid stored in the fluid reservoir means 57 to move to the plurality of cylinder portions 47 of the first and second fluid pressure motor means 35, 39. The fluid supply means 43 is preferably provided with hydraulic lines 61 for allowing the pump means 59 to move fluid from the fluid reservoir means 57 to the plurality of cylinder portions 47 of the first and second fluid pressure motor means 35, 39. The hydraulic lines 61 preferably include portions 61' in the axle 55 of the third wheel 37 adjacent the offset portion 55' and include portions 61" extending the length of each of the plurality of piston rod members 53 (see FIGS. 2 and 3). An injector means 63 is provided in each of the plurality of piston members 49 for selectively allowing the fluid from the fluid reservoir means 57 to enter the plurality of cylinder portions 47 by way of the portions 61" of the hydraulic lines 61. The fluid supply means 43 is also preferably provided with hydraulic lines 65 for allowing the fluid to return from the plurality of cylinder portions 47 to the fluid reservoir means 57. The hydraulic lines 65 preferably include a portion 65' in the axle 55 of the third wheel 37 for allowing communication with the interior 45' of the body member 45 of the first fluid pressure motor means 35. A similar arrangement is provided relative to the fourth wheel 41.

Conveniently, the means 11 may include a battery means 67 for operating the first and second electric motor means 13, 17 of the preliminary drive means and for operating the plurality of heating members 51 and the pump means 59 of the main drive means. In addition, an electric circuit means 69 is preferably provided for electrically connecting the first and second electric motor means 13, 17 of the preliminary drive means, the plurality of heating members 51 and the pump means 59 of the main drive means, and the battery means 67. The circuit means 69 preferably includes a variable switch means 71 for allowing the amount of electricity going to the plurality of heating members 51 and the pump means 59 of the main drive means from the battery means 67 to be varied thereby varying the speed at which the vehicle is propelled. In addition, the electric circuit means 69 preferably includes a forward-reverse switch means 73 for allowing the first and second electric motor means 13, 17 of the preliminary drive means to be activated in either a forward or a reverse mode to cause the vehicle V to be propelled in either a forward or a reverse direction. Also, the electric circuit means 69 preferably includes a key lock master switch 75 of a type well known to those skilled in the art for allowing only authorized persons to operate the vehicle V.

The means 11 preferably includes a fluid condenser-cooling means 77 for condensing and cooling the fluid after the fluid has been expanded in the plurality of cylinder portions 47 of the main drive means by the plurality of heating members 51 and before it is returned to the fluid reservoir means 57. The fluid condenser-cooling means 77 is preferably provided in the hydraulic lines 65 (see FIG. 1).

The first and second electric motor means 13, 17 of the preliminary drive means are preferably adapted to act as generators after the main drive means has commenced the propulsion of the vehicle V to recharge the battery means 67. The motor means 13, 17 when acting as generators can only partially recharge the battery means 67.

The preferred method of operation of the means 11 of the present invention is quite simple. To commence the propulsion of the vehicle V, the first step is to activate the electric circuit means 69 by closing the key lock master switch 75. Next, the first and second electric motor means 13, 17 are activated in either a forward or a reverse mode by way of the forward-reverse switch means 73 thereby commencing the propulsion of the vehicle V in either a forward or a reverse direction. Next, the first and second fluid pressure motor means 35, 39 are activated through the variable switch means 71 and the speed at which the vehicle V is propelled is thereby controlled by the varible switch means 71.

As thus constructed and used, the present invention provides a means for propelling a wheeled vehicle which is highly efficient in its use of energy, which is simple to construct and use, and which does not have any of the disadvantages associated with propelling vehicles by the use of steam or electrical energy.

Although the invention has been described and illustrated with respect to a preferred embodiment thereof, it is not to be so limited since changes and modifications may be made therein which are within the full intended scope of the invention.

I claim:

1. Means for propelling a wheeled vehicle, said means comprising:
    (a) preliminary drive means for commencing the propulsion of the vehicle; and
    (b) main drive means for propelling the vehicle after said preliminary drive means has commenced the propulsion of the vehicle, said main drive means including at least one fluid pressure motor means for driving at least one wheel of the vehicle and including fluid supply means for supplying fluid to said fluid pressure motor means, said fluid pressure motor means including a body member for being fixedly attached to the wheel being driven by said fluid pressure motor means, said body member having a plurality of cylinder portions provided therein, each of said cylinder portions being adapted to selectively receive fluid from said fluid supply means, said fluid pressure motor means including a plurality of piston members with one of said piston members provided in each of said cylinder portions for back and forth movement therein, said fluid pressure motor means including a plurality of heating members with one of said heating members provided adjacent each of said cylinder portions for selectively causing the fluid in each of said cylinder portions to expand thereby causing said piston members to slide back and forth in said cylinder portions, said fluid pressure motor means including a plurality of piston rod members, each of said piston rod members having a first end pivotally attached to one of said piston members and having a second end for being pivotally attached to the frame of the vehicle at a location eccentric of the axle of the wheel being driven by said fluid pressure motor means so that back and forth movement of said piston members in said cylinder portions will cause rotation of the wheel thereby propelling the vehicle.

2. The means for propelling a wheeled vehicle of claim 1 in which said fluid supply means of said main drive means includes fluid reservoir means for storing fluid and includes pump means for moving fluid from said fluid reservoir means to said cylinder portions of said fluid pressure motor means.

3. The means for propelling a wheeled vehicle of claim 2 in which said preliminary drive means includes at least one electric motor means for driving at least one wheel of the vehicle to commence the propulsion of the vehicle.

4. The means for propelling a wheeled vehicle of claim 3 in which is included battery means for operating said electric motor means of said preliminary drive means and for operating said heating members and said pump means of said main drive means.

5. The means for propelling a wheeled vehicle of claim 4 in which said electric motor means of said preliminary drive means is adapted to act as a generator after said main drive means has commenced the propulsion of the vehicle to recharge said battery means.

6. Means for propelling a four-wheeled vehicle, said means comprising:
   (a) preliminary drive means for commencing the propulsion of the vehicle, said preliminary drive means including a first electric motor means for driving a first wheel of the vehicle and including a second electric motor means for driving a second wheel of the vehicle;
   (b) main drive means for propelling the vehicle after said preliminary drive means has commenced the propulsion of the vehicle; said main drive means including a first fluid pressure motor means for driving a third wheel of the vehicle, including a second fluid pressure motor means for driving a fourth wheel of the vehicle and including fluid supply means for supplying fluid to said first and second fluid motor means; each of said first and second fluid pressure motor means including a body member for fixedly attaching to the respective third and fourth wheels, said body member having a plurality of cylinder portions provided therein, each of said cylinder portions being adapted to receive fluid from said fluid supply means, each of said first and second fluid motor means including a plurality of piston members with one of said piston members provided in each of said cylinder portions for back and forth movement therein, each of said first and second fluid motor means including a plurality of heating members with one of said heating members provided adjacent each of said cylinder portions for causing the fluid in each of said cylinder portions to expand thereby causing said piston members to slide back and forth in said cylinder portions, and each of said first and second fluid motor means including a plurality of piston rod members, each of said piston rod members having a first end pivotally attached to one of said piston members and having a second end pivotally attached to the frame of the vehicle at a location eccentric to the axle of the respective third and fourth wheels of the vehicle so that back and forth movement of said piston members in said cylinder portions will cause rotation of the respective third and fourth wheels thereby propelling the vehicle; said fluid supply means including fluid reservoir means for storing fluid and including pump means for moving fluid from said fluid reservoir means to said cylinder portions of said first and second fluid pressure motor means; and
   (c) battery means for operating said first and second electric motor means of said preliminary drive means and for operating said heating members and said pump means of said main drive means.

7. The means for propelling a four-wheeled vehicle of claim 6 in which is included electric circuit means for electrically connecting said first and second electric motor means of said preliminary drive means, said heating members and said pump means of said main drive means, and said battery means; said circuit means including variable switch means for allowing the amount of electricity going to said heating members and said pump means of said main drive means from said battery means to be varied thereby varying the speed at which the vehicle is propelled; said circuit means including a forward-reverse switch means for allowing said first and second electric motor means of said preliminary drive means to be activated in either a forward or a reverse mode to cause the vehicle to be propelled in either a forward or a reverse direction.

8. The means for propelling a four-wheeled vehicle of claim 7 in which is included a fluid condenser-cooling means for condensing and cooling the fluid after the fluid has been expanded in said cylinder portions of said main drive means by said heating members and before it is returned to said fluid reservoir means.

9. The means for propelling a four-wheeled vehicle of claim 8 in which said first and second electric motor means of said preliminary drive means are adapted to act as generators after said main drive means has commenced the propulsion of the vehicle to recharge said battery means.

* * * * *